US005784909A

United States Patent [19]

Huang

[11] Patent Number: 5,784,909

[45] Date of Patent: Jul. 28, 1998

[54] CONTROL MECHANISM FOR TUBULAR LOCKS

[75] Inventor: Lan Shi Huang, Kaohsiung, Taiwan

[73] Assignee: Taiwan Fu Hsing Industry Co., Ltd., Kaohsiung Hsien, Taiwan

[21] Appl. No.: 843,775

[22] Filed: Apr. 22, 1997

[51] Int. Cl.$^6$ .......... B60R 25/02

[52] U.S. Cl. .......... 70/224; 292/336.3; 292/357; 70/223

[58] Field of Search .......... 70/221, 224, 215–218, 70/452; 292/336.3, 348, 357

[56] References Cited

U.S. PATENT DOCUMENTS

| | | | |
|---|---|---|---|
| 5,118,152 | 6/1992 | Lin | 292/357 X |
| 5,157,952 | 10/1992 | Lin | 70/224 X |
| 5,190,327 | 3/1993 | Lin | 292/357 X |
| 5,284,372 | 2/1994 | Lin | 292/336.3 |
| 5,372,025 | 12/1994 | Lin | 70/223 X |
| 5,556,144 | 9/1996 | Lin | 70/224 X |
| 5,564,296 | 10/1996 | Theriault et al. | 70/224 |
| 5,598,726 | 2/1997 | Cordle | 70/224 |
| 5,666,833 | 9/1997 | Gao et al. | 70/224 |

*Primary Examiner*—Suzanne Dino Barrett
*Attorney, Agent, or Firm*—Bacon & Thomas

[57] ABSTRACT

A tubular lock assembly includes an inner handle, an outer handle, and a control mechanism. An outer protective cover is mounted to the outer side of the door plate and includes a pair of notches defined therein. The control mechanism includes a tubular shaft, a latch plate including a pair of protrusions formed on a mediate portion thereof, and a stop plate including two teeth. The tubular shaft includes a first end securely attached to the inner handle to rotate therewith and a second end. Two blocks are formed on the second end of the tubular shaft and have an operative recess defined therebetween. The teeth of the stop plate are received in the notches of the outer protective cover when the tubular lock assembly is in a locked position, and rotation of the inner handle in either direction causes the protrusions to be received in the operative recess of the tubular shaft such that the teeth of the stop plate disengage from the notches of the outer protective cover for unlatching.

4 Claims, 7 Drawing Sheets

FIG.1

CONTROL MECHANISM FOR TUBULAR LOCKS

BACKGROUND OF THE INVENTION

1. Field of the Invention

The present invention relates to a control mechanism for tubular locks in which rotation of an inner handle in either direction may achieve the unlatching function.

2. Description of the Related Art

A wide variety of tubular locks have heretofore been provided, and examples of which are disclosed by U.S. Pat. Nos. 5,190,327, 5,257,838, and 5,284,372. In operation, when a button in an inner handle is pushed or switched, the lock is in a locked position. Unlocking of the lock can be achieved by using a proper key or rotating the inner handle. The present invention is intended to provide an improved control mechanism for the tubular locks in which rotation of an inner handle in either direction may achieve the unlatching function.

SUMMARY OF THE INVENTION

A tubular lock assembly in accordance with the present invention comprises an inner handle rotatably mounted to an inner side of a door plate, an outer handle rotatably mounted to an outer side of the door plate, and a control mechanism. A button is rotatably mounted in the inner handle. A first means is provided for returning the inner handle after a rotational movement of the inner handle. An outer protective cover is mounted to the outer side of the door plate and includes a pair of notches defined therein. A sleeve has a first end securely attached to the outer handle to rotate therewith and a second end. A lock core is mounted in the outer handle.

The control mechanism comprises a tubular shaft having a first end securely attached to the inner handle to rotate therewith and a second end. Two blocks are formed on the second end of the tubular shaft and have an operative recess defined therebetween. A latch plate extends through the tubular shaft and includes a first end attached to and thus rotatably actuated by the button and a second end attached to the lock core to rotate therewith. The latch plate further includes a pair of protrusions formed on a mediate portion thereof. A second means is provided for biasing the protrusions of the latch plate to bear against the second end of the tubular shaft.

A stop plate includes a central hole through which the latch plate fittingly extends, the stop plate being engaged with the tubular shaft to rotate therewith. The stop plate further includes two teeth respectively, removably received in the notches of the outer protective cover. A third means is provided for biasing the teeth of the stop plate to disengage from the notches of the outer protective cover for unlatching.

The teeth of the stop plate are received in the notches of the outer protective cover when the tubular lock assembly is in a locked position, and rotation of the inner handle in either direction causes the protrusions to be received in the operative recess of the tubular shaft such that the teeth of the stop plate disengage from the notches of the outer protective cover by the third means for unlatching.

Each block of the tubular shaft includes an operative edge for engaging with and thus actuating the latch plate to rotate therewith. Preferably, the stop plate further includes two first recesses and two second recesses defined in a side thereof, wherein the tubular lock assembly is in a locked position when the protrusions of the latch plate are received in the second recesses, and wherein the latch plate does not rotate during a returning motion of the tubular shaft when the protrusions of the latch plate are received in the first recesses. Preferably, each block of the tubular shaft includes a descending surface for contacting with the associated protrusion of the latch plate.

Other objects, advantages, and novel features of the invention will become more apparent from the following detailed description when taken in conjunction with the accompanying drawings.

DESCRIPTION OF THE PREFERRED EMBODIMENT

Figure 1:
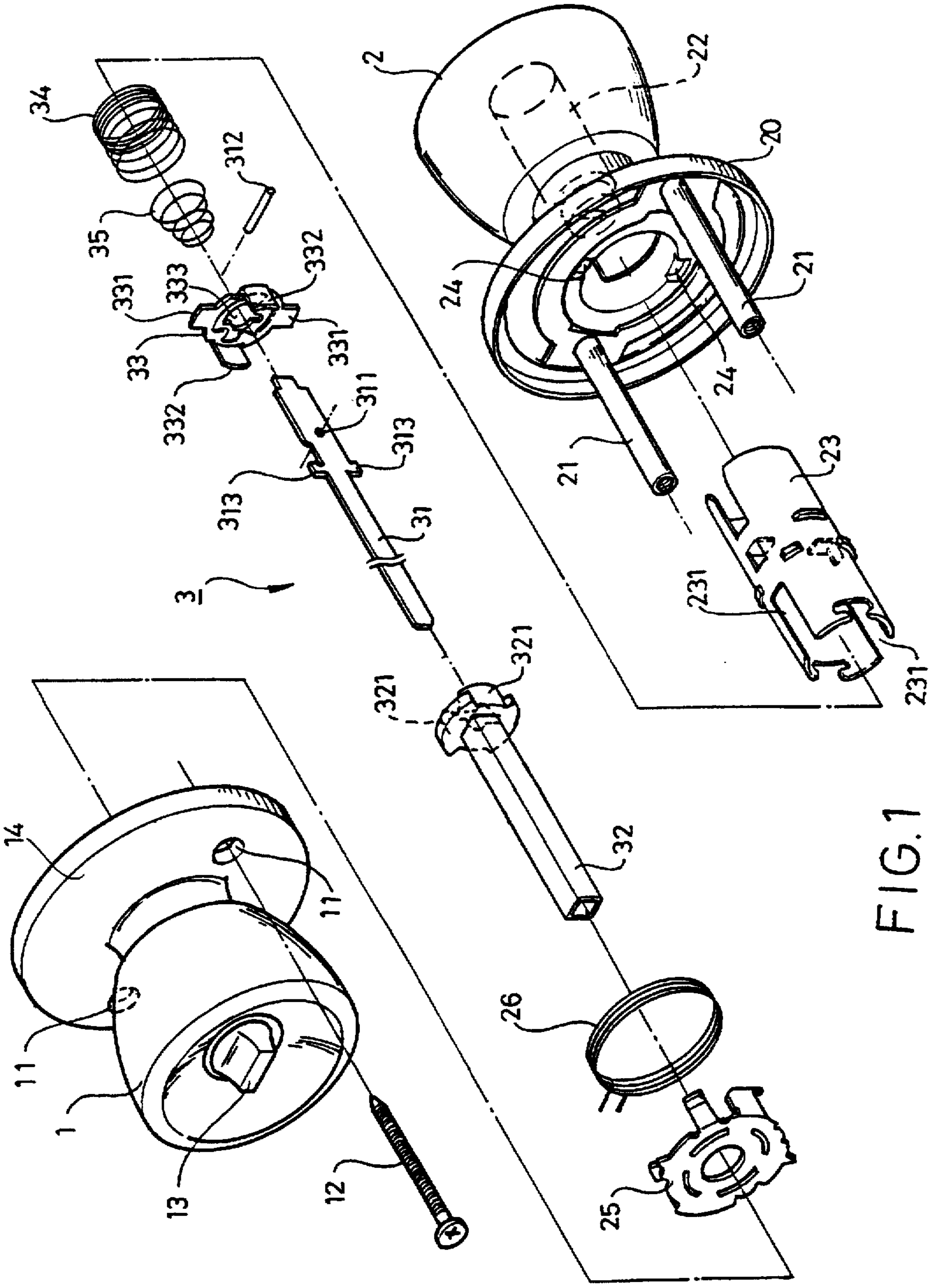
FIG. 1 is an exploded perspective view of a tubular lock assembly in accordance with the present invention.
Figure 4:
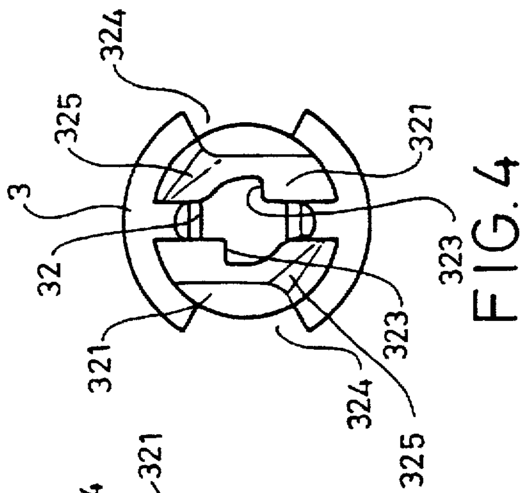
FIG. 4 is a side elevational view of the tubular shaft.
Figure 2:
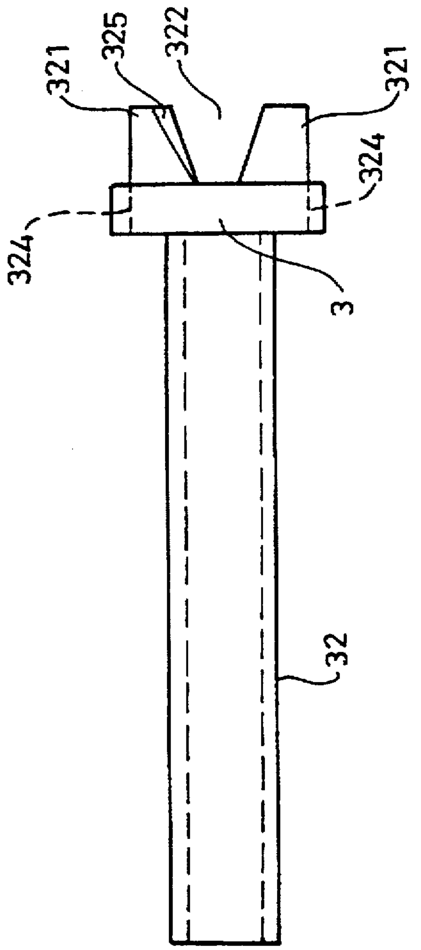
FIG. 2 is a top plan view of a tubular shaft of the tubular lock assembly in accordance with the present invention.
Figure 3:
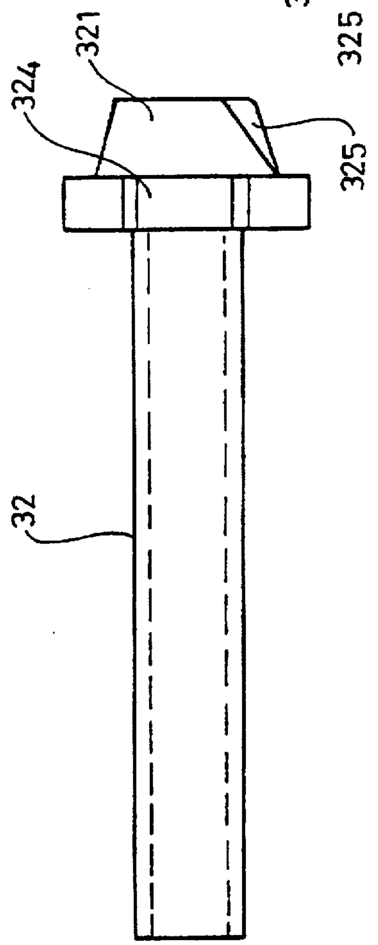
FIG. 3 is a front elevational view of the tubular shaft.

Referring to FIG. 1, a tubular lock assembly in accordance with the present invention comprises an inner handle 1, an outer handle 2, and a control mechanism 3. The inner handle 1 is mounted (by screws 12 extending through holes 11 defined in an inner protective cover 14 mounted to an inner side of a door plate to which the tubular lock assembly is mounted) to the inner side of the door plate. The inner handle 1 includes a button 13 rotatably mounted thereto which will be described later. A spring 16 (see FIG. 7) is attached to the inner handle 1 for returning the inner handle 1 after a rotational force applied to the inner handle 1 is released.

The outer handle 2 includes an outer protective cover 20 mounted to an outer side of the door plate, and a lock core 22 is mounted in the outer handle 2. A pair of posts 21 project from a side of the outer protective cover 20 and extend through the door plate. Each of the posts 21 includes a screw hole (not labeled) defined therein for receiving the screws 12. A sleeve 23 is attached to the outer handle 2 to rotate therewith and includes a vertical slot 231 defined in an end thereof. An end plate 25 and an elastic member 26 are mounted to an end of the sleeve 23 to prevent disengagement of the control mechanism 3 mounted in the sleeve 23.

The control mechanism 3 is received in the sleeve 23 and includes a tubular shaft 32 having a first end securely attached to the inner handle 1 to rotate therewith. The control mechanism 3 further includes a latch plate 31, a stop plate 33, and elastic members 34 and 35. The latch plate 31 is rotatably extended through the tubular shaft 32 and includes a first end attached to and thus rotatably actuatable by the button 13 and a second end attached to the lock core 22 to rotate therewith. The latch plate 31 is positioned by a pin 312 extending through a hole 311 defined therein. The latch plate 31 further includes a pair of protrusions 313 formed on a mediate portion thereof.

The tubular shaft 32 engages with a latch bolt (not shown) which may be extended into a receptacle defined in a door jamb (not shown) under rotational movement of the tubular shaft 32 responsive to rotational movement of the inner handle 1, which is conventional and therefore not further described. Referring to FIGS. 1 to 4, the tubular shaft 32 includes a second end on which two blocks 321 are formed. The pin 312 is biased by the elastic member 35 to urge the protrusions 313 to always bear against the blocks 321. The blocks 321 have an operative recess 322 defined therebetween each includes a descending surface 325 such that the associated protrusion 313 may move downwardly in a smooth manner and slide into the operative recess 322. Each protrusion 313 may bear against an upper portion of the associated block 321 or a bottom wall defining the operative recess 322 for limiting rotational movements of the latch plate 31. In addition, rotational movement of the tubular shaft 32 may return the latch plate 31 to its initial position. Each block 321 further includes an operative edge 323 for urging the latch plate 31 to rotate. Each block 321 further includes a notch 324 which will be described later.

Figure 6:
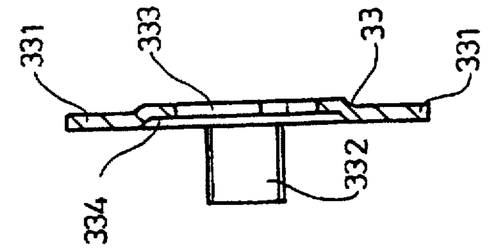
FIG. 6 is a cross sectional view taken along line 6—6 in FIG. 5.
Figure 5:
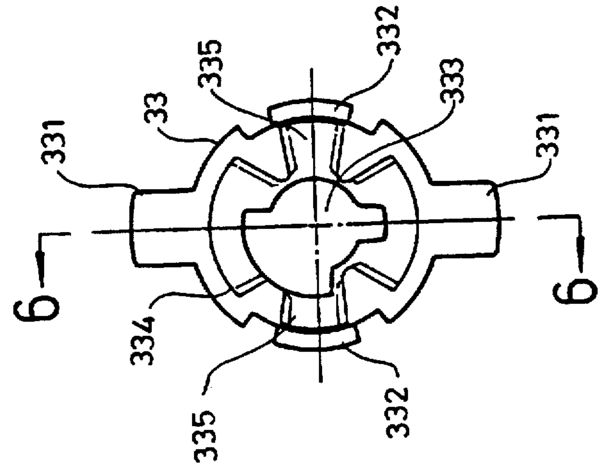
FIG. 5 is a front elevational view of a stop plate of the tubular lock assembly.

Referring to FIGS. 1, 5 and 6, the stop plate 33 includes a central hole 333 through which the latch plate 31 fittingly extends. The stop plate 33 includes two diametrically extending teeth 331 formed on an outer periphery thereof and two diametrically opposed legs 332 projecting outwardly from the outer periphery thereof and extending in a direction parallel to a longitudinal axis of the stop plate 33. The teeth 331 of the stop plate 33 extend through the slot 231 to prevent relative rotational movement between the stop plate 33 and the sleeve 23. The legs 332 of the stop plate 33 are biased by the elastic member 34 to securely engage with the notches 324 of the tubular shaft 32 to move therewith. The teeth 331 of the stop plate 33 may be removably received in two diametrically disposed notches 24 defined in the outer protective cover 20. Two first recesses 334 and two second recesses 335 which are defined in a side of the stop plate 33 in which a side of each protrusion 313 of the latch plate 31 bears against the bottom wall defining the associated first recess 334. When the sleeve 23 is rotated, if the protrusions 313 are received in the first recesses 334, the latch plate 31 is not rotatable during returning motion of the sleeve 23, thereby achieving the unlatching function. Yet when the protrusions 313 are received in the second recesses 335, the latch plate 33 is in a locked position.

Figure 7:
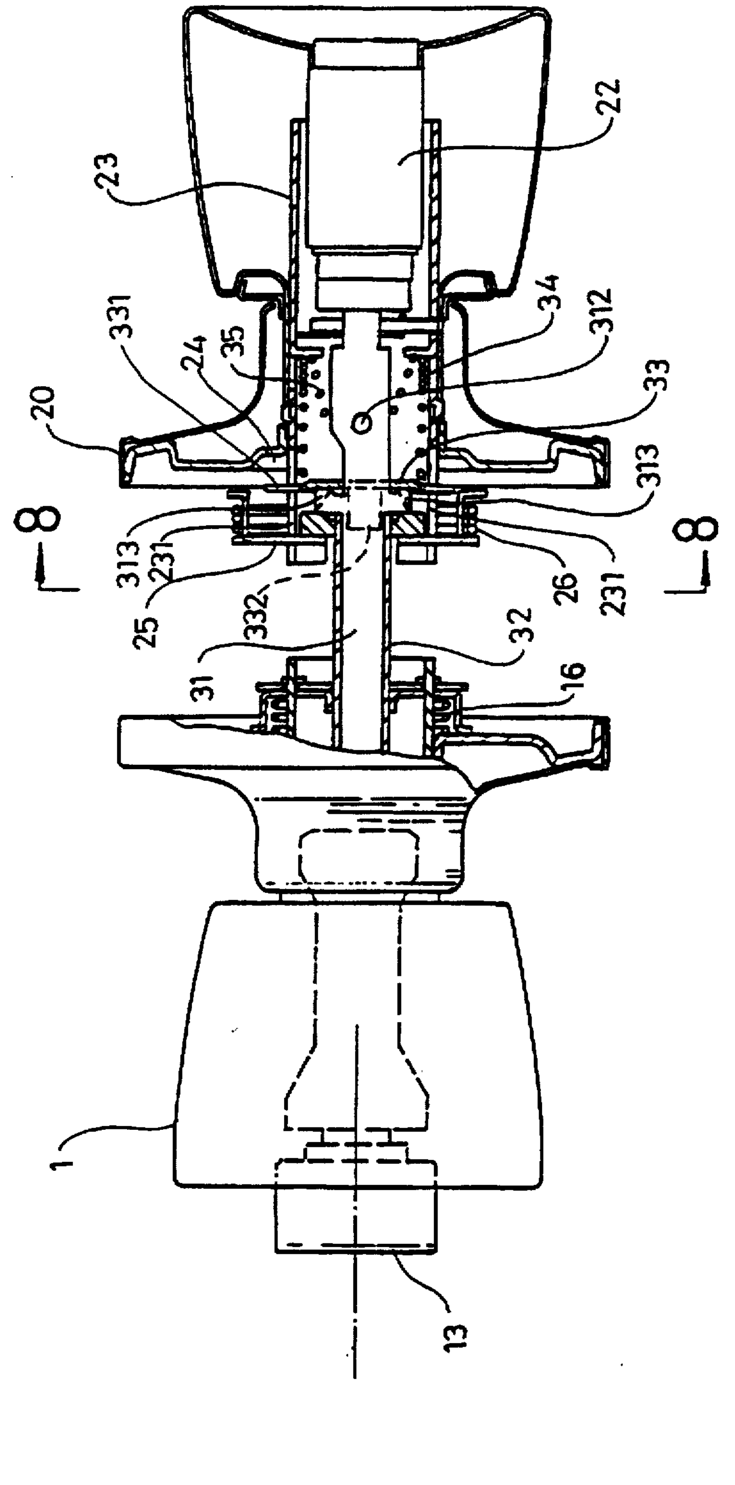
FIG. 7 is a schematic side elevational view, partly sectioned, of the tubular lock assembly in accordance with the present invention, wherein the lock assembly is in an unlatched position.
Figure 8:
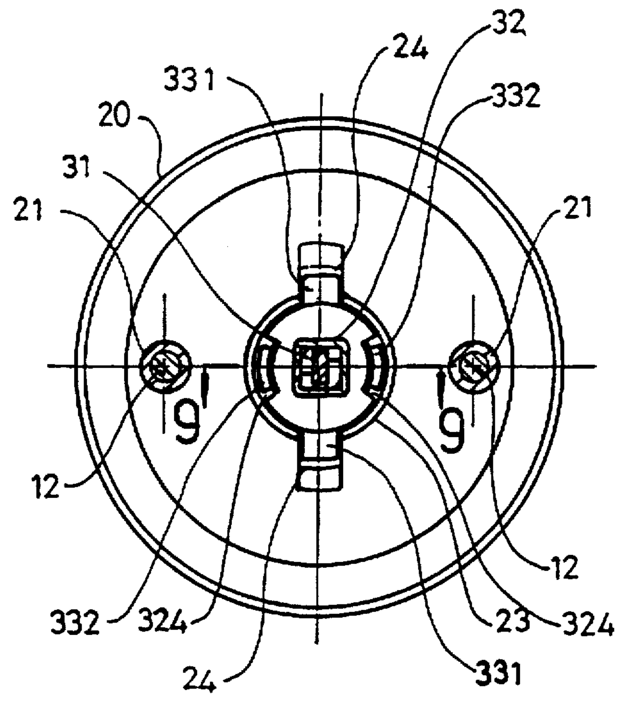
FIG. 8 is a cross sectional view taken along line 8—8 in FIG. 7.
Figure 9:
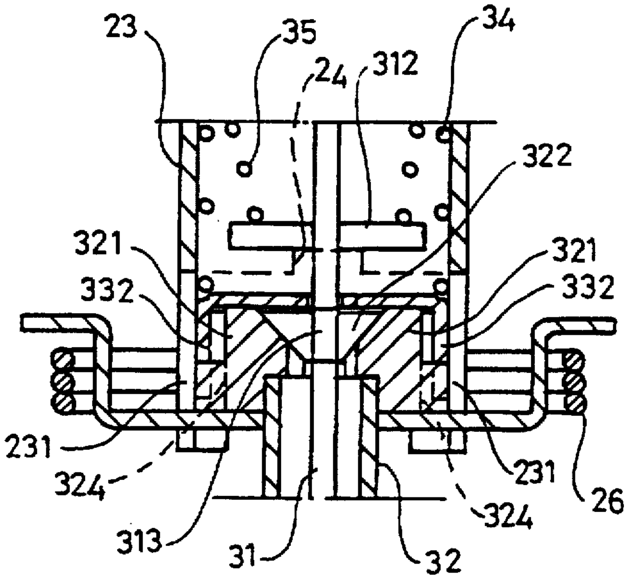
FIG. 9 is a cross sectional view taken along line 9—9 in FIG. 8.

Referring now to FIGS. 7 to 9, in which the lock assembly is in an unlocked position, i.e. either the inner handle 1 or the outer handle 2 can be rotated, and in which the protrusions 313 of the latch plate 31 are received in the operative recess 322 of the tubular shaft 32. The stop plate 33 is biased by the elastic member 35 such that the teeth 331 disengage from the notches 24 of the outer protective cover 20, thereby allowing rotational movement of either handle 1 and 2.

Figure 10:
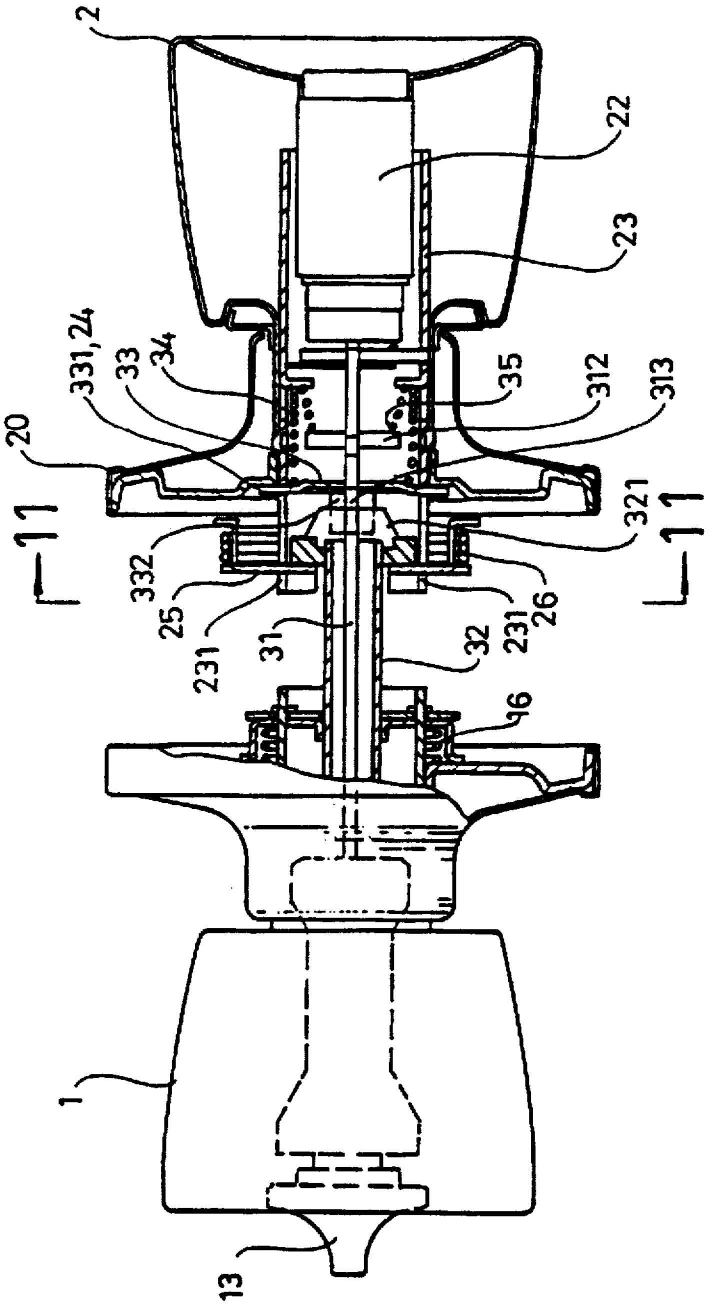
FIG. 10 is a view similar to FIG. 7, wherein the lock assembly is in a locked position.
Figure 11:
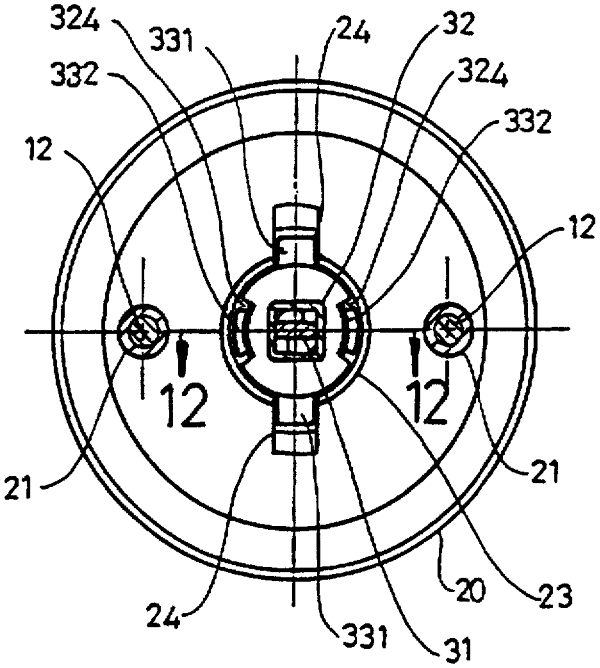
FIG. 11 is a cross sectional view taken along line 11—11 in FIG. 10.
Figure 12:
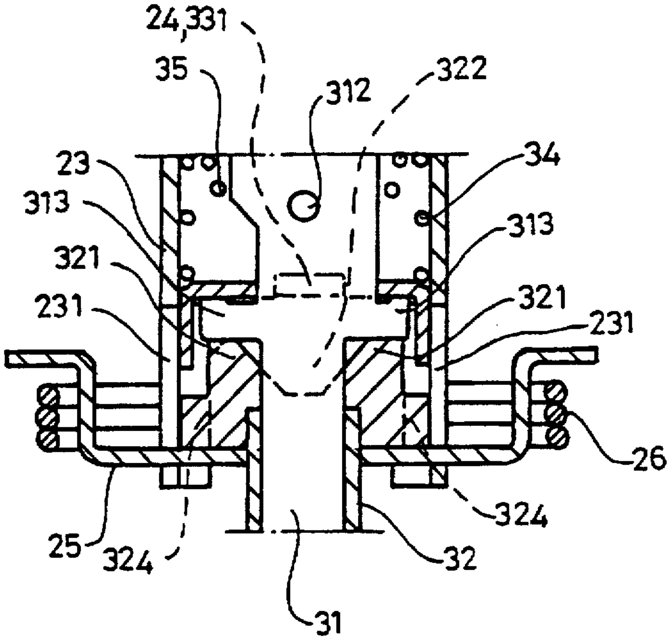
FIG. 12 is a cross sectional view taken along line 12—12 in FIG. 10.

Referring to FIGS. 10 to 12, in which the lock assembly is in a locked position. Under rotational movement of either the button 13 or the lock core 22, each protrusion 313 of the latch plate 31 moves along the associated block 321 and then bears against a top of the associated block 321. Thus, the stop plate 33 is moved such that the teeth 331 enter the notches 24 of the outer protective cover 20. Accordingly, the stop plate 33 as well as the sleeve 23 cannot be rotated since the outer protective cover 20 is fixed. Under the locked status, the outer handle 2 cannot be rotated without a proper key. When the proper key is inserted into a key hole of the lock core 22 and then rotated through an angle, the latch plate 31 is rotated, and the latch plate 31 and the stop plate 33 are returned to their unlocked positions by the elastic members 35 and 34 to thereby allow rotation of the outer handle 2.

When in the locked position, if the inner handle 1 is rotated in a direction (e.g., a clockwise direction in FIG. 11) through an angle, the tubular shaft 32 is rotated such that the operative edges 323 of the tubular shaft 32 together with the latch plate 31 rotate, which in turn, causes the protrusions 313 of the latch plate 31 to enter from the second recesses 335 to the first recesses 334. When the inner handle 1 returns to its initial position, the latch plate 31 does not rotate in the beginning since the protrusions 313 of the latch plate 31 are retained in the second recesses 334. This is because the stop plate 33 does not rotate either since the teeth 331 of the stop plate 31 are retained in the notches 24 of the outer protective cover 20. Nevertheless, when the tubular shaft 32 rotates to a position in which the operative recess 322 of the tubular shaft 32 aligns with the protrusion 313 of the latch plate 31, the elastic member 35 biases the latch plate 31 such that the protrusions 313 enter the operative recess 322, thereby achieving the unlatching function.

When in the locked position, if the inner handle 1 is rotated in another direction (e.g., a counterclockwise direction in FIG. 11) through an angle, the tubular shaft 32 cannot urge the latch plate 31 to rotate therewith. Nevertheless, the protrusions 313 of the latch plate 31 slide from the tops of the blocks 321 to the descending surfaces 325. The latch plate 31 is biased by the elastic member 35 such that the protrusions 313 are received in the operative recess 322 of the tubular shaft 32, thereby achieving the unlatching function.

By such an arrangement, rotation of the inner handle 1 in either direction may achieve the unlatching function.

Although the invention has been explained in relation to its preferred embodiment, it is to be understood that many other possible modifications and variations can be made without departing from the spirit and scope of the invention as hereinafter claimed.

What is claimed is:

1. A tubular lock assembly, comprising:

an inner handle adapted to be rotatably mounted to an inner side of a door plate, a button being rotatably mounted in the inner handle;

a first means for returning the inner handle after a rotational movement of the inner handle;

an outer handle adapted to be rotatably mounted to an outer side of the door plate, an outer protective cover being mounted to the outer side of the door plate and including a pair of notches defined therein, a sleeve having a first end securely attached to the outer handle to rotate therewith and a second end, a lock core being mounted in the outer handle; and a control mechanism comprising:

a tubular shaft having a first end securely attached to the inner handle to rotate therewith and a second end, two blocks being formed on the second end of the tubular shaft and having an operative recess defined therebetween, a latch plate extending through the tubular shaft and including a first end attached to and thus rotatably actuated by the button and a second end attached to the lock core to rotate therewith, the latch plate further including a pair of protrusions formed on a mediate portion thereof, and a second means for biasing the protrusions of the latch plate to bear against the second end of the tubular shaft, a stop plate including a central hole through which the latch plate fittingly extends, the stop plate being engaged with the tubular shaft to rotate therewith, the stop plate further including two teeth respectively, removably received in the notches of the outer protective cover, and a third means for biasing the teeth of the stop plate to disengage from the notches of the outer protective cover for unlatching;

whereby the teeth of the stop plate are received in the notches of the outer protective cover when the tubular lock assembly is in a locked position, and unlatched by rotation of the inner handle in either direction which causes the protrusions to be received in the operative recess of the tubular shaft such that the teeth of the stop plate disengage from the notches of the outer protective cover by the third means.

2. The tubular lock assembly according to claim 1, wherein each said block of the tubular shaft includes an operative edge for engaging with and thus actuating the latch plate to rotate therewith.

3. The tubular lock assembly according to claim 1, wherein the stop plate further includes two first recesses and two second recesses defined in a side thereof, wherein the tubular lock assembly is in a locked position when the protrusions of the latch plate are received in the second recesses, and wherein the latch plate does not rotate during a returning motion of the tubular shaft when the protrusions of the latch plate are received in the first recesses.

4. The tubular lock assembly according to claim 1, wherein each said block of the tubular shaft includes a descending surface for contacting with the associated protrusion of the latch plate.

* * * * *